United States Patent
Bouzouraa

(10) Patent No.: US 9,903,951 B2
(45) Date of Patent: Feb. 27, 2018

(54) METHOD FOR PROCESSING ENVIRONMENTAL DATA IN A VEHICLE

(71) Applicant: AUDI AG, Ingolstadt (DE)

(72) Inventor: Mohamed Essayed Bouzouraa, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 107 days.

(21) Appl. No.: 14/848,767

(22) Filed: Sep. 9, 2015

(65) Prior Publication Data

US 2016/0068164 A1    Mar. 10, 2016

(30) Foreign Application Priority Data

Sep. 10, 2014    (DE) .................. 10 2014 013 432

(51) Int. Cl.
*B60W 40/02* (2006.01)
*G01S 7/295* (2006.01)
*G01S 17/93* (2006.01)
*G01S 13/93* (2006.01)
*G08G 1/16* (2006.01)

(52) U.S. Cl.
CPC ............ *G01S 17/936* (2013.01); *G01S 7/295* (2013.01); *G01S 13/931* (2013.01); *G01S 2013/9367* (2013.01); *G08G 1/166* (2013.01)

(58) Field of Classification Search
CPC .... B60W 40/02; G01S 17/936; G01S 13/931; G01S 7/295; G01S 2013/9367; G08G 1/166
See application file for complete search history.

(56) References Cited

U.S. PATENT DOCUMENTS

| | | | | |
|---|---|---|---|---|
| 5,832,407 A | * | 11/1998 | Kai | G01S 7/4972 342/71 |
| 6,191,704 B1 | * | 2/2001 | Takenaga | G01S 13/42 180/169 |
| 7,512,516 B1 | * | 3/2009 | Widmann | G01S 13/42 702/151 |
| 2003/0201929 A1 | * | 10/2003 | Lutter | G01S 7/032 342/52 |
| 2004/0080449 A1 | * | 4/2004 | Horibe | G01S 7/4026 342/70 |
| 2006/0023917 A1 | * | 2/2006 | Dickmann | G01S 7/4802 382/104 |
| 2008/0088424 A1 | * | 4/2008 | Imura | B60W 30/095 340/436 |
| 2011/0234761 A1 | * | 9/2011 | Yumiba | B60R 1/00 348/46 |
| 2013/0103259 A1 | * | 4/2013 | Eng | B60G 17/019 701/37 |

FOREIGN PATENT DOCUMENTS

| | | |
|---|---|---|
| DE | 10 2004 032 118 | 1/2006 |
| DE | 10 2006 056 835 | 6/2008 |
| DE | 10 2013 210 263 | 12/2014 |

* cited by examiner

*Primary Examiner* — Stephen Holwerda
(74) *Attorney, Agent, or Firm* — Henry M. Feiereisen LLC

(57) ABSTRACT

Sensor information is processed in a vehicle by transforming sensor data acquired with at least one sensor of the vehicle from a current environment of the vehicle into a curved coordinate system, by continuously updating the sensor data while the vehicle is moving, and by dynamically adapting the curved coordinate system to a current situation of the vehicle.

13 Claims, 1 Drawing Sheet

METHOD FOR PROCESSING ENVIRONMENTAL DATA IN A VEHICLE

CROSS-REFERENCES TO RELATED APPLICATIONS

This application claims the priority of German Patent Application, Serial No. 10 2014 013 432.6, filed Sep. 10, 2014, pursuant to 35 U.S.C. 119(a)-(d), the content of which is incorporated herein by reference in its entirety as if fully set forth herein.

BACKGROUND OF THE INVENTION

The present invention relates to a method for processing sensor information in a vehicle, and a corresponding method for controlling a vehicle, wherein sensor data are transformed and transferred to a curved coordinate system. The present invention further relates to a vehicle with a central control unit for performing the method according to the invention.

The following discussion of related art is provided to assist the reader in understanding the advantages of the invention, and is not to be construed as an admission that this related art is prior art to this invention.

For automatic control and driver assistance through automated vehicle control systems, information about a current environment of a particular vehicle is required. To adapt specific components of the vehicle, such as the suspension, brakes or steering to the current environment of the vehicle and to avoid faulty controls, e.g. due to environmental effects, calculations for controlling the vehicle systems must be continuously adjusted to a current situation or environment of the respective vehicle.

To interpret respective sensor data, provided for example by a laser, radar, camera, time of flight sensor, or any other technically suitable sensor for detecting a current environment of a vehicle, and to use these sensor data for controlling vehicle components, the sensor data need to be transformed and associated with the current environment of the vehicle.

Approaches are being pursued in the prior art, which require a fixed Cartesian orientation of a respective coordinate system so that discretization is always carried out along two orthogonal linear axes. Chassis systems, however, usually need information about the street level along a future roadway. Such roadway is usually curved and thus not always a straight line. To account for a curved road, the prior art attempts to extract relevant information for respective chassis functions or for assistance systems from respective data of a coordinate system along a respective curved route. However, such approaches require an increased computational complexity and associated precision errors when converting a quantized linear grid into a curved representation, for example, during an extraction step.

It would therefore be desirable and advantageous to obviate prior art shortcomings and to provide an improved method for processing sensor information with a vehicle, wherein sensor data of a current environment of the vehicle and determined with at least one sensor encompassed by the vehicle are transformed and are entered in a curved coordinate system. A curved coordinate system in the context of the presented invention is defined as a coordinate system which is diffeomorphic to Cartesian coordinates. In particular, a curved coordinate system is defined as a polar, cylindrical, or spherical coordinate system.

SUMMARY OF THE INVENTION

According to one aspect of the present invention, sensor data determined with at least one sensor encompassed by the vehicle of a current environment of the vehicle are transformed and are entered in a curved coordinate system, wherein for compensating an inherent movement of the vehicle during travel, the sensor data are continuously updated and the curved coordinate system is dynamically adapted to a current situation of the vehicle.

To reduce costly conversion procedures for adapting, for example, Cartesian coordinates to a current curved route or to dispense entirely with such conversion procedures, according to the inventive method, sensor data from a respective sensor, such as a laser sensor, a radar sensor, a camera or a time of flight sensor, are transformed immediately after detection by the respective sensor and entered in a curved coordinate system, wherein the curved coordinate system is dynamically adapted, i.e. parameterized, depending on a situation of the respective vehicle, i.e. by tracking a movement of the vehicle.

In other words, the sensor data are adapted to a current situation of the respective vehicle directly by a transformation into the curved coordinate system, since the curved coordinate system includes the current situation of the vehicle, because it is parameterized as a function of the current situation of the vehicle and hence reflects the current situation of each vehicle.

As an environment of the vehicle is usually not straight, the environment only is inadequately reproduced by a Cartesian coordinate system. This means that sensor data of the environment which correspond for example to a curved route, also are shown curved in a Cartesian coordinate system, whereas such sensor data are rendered, for example, linear or optimized in a different way in a curved coordinate system. Accordingly, information about a particular environment is already provided by the shape of a curved coordinate system itself. A combination of the information provided by the shape of the curved coordinate system and relevant sensor data therefore produces a synergistic effect, since the sensor data, which indicate for example a height, can be interpreted immediately in relation to respective environment properties by entering the sensor data into a curved coordinate system.

It is conceivable that the curved coordinate system includes several grids, which are associated with respective components of the vehicle, such as wheels and which change depending on a position of the components so that the respective sensor data are entered in a respective grid only when the sensor data are relevant for that component. Corresponding data of the respective grids can thus be used due to their compactness as interfaces between respective control devices, i.e. between a central control unit transforming the sensor data and, for example, a control unit of a respective vehicle component in which the data entered in the respective grid can be transmitted via, for example, a bus system of the vehicle.

In another possible embodiment of the method according to the invention, at least one component of at least one automatic vehicle control system of the vehicle may be adapted to the current environment of the vehicle depending on the data currently entered in the curved coordinate system.

To use the transformed sensor data entered in the curved coordinate system for automatic control of the vehicle, the sensor data entered in the curved coordinate system may be transmitted either directly to a control unit of a respective driver assistance system, such as an electronic stability program ESP, an antilock braking system ABS or any other technically appropriate system for controlling a vehicle. Furthermore, the respective control device of the driver assistance system may use the transmitted data for further computations or the respective control device of the driver assistance system may, whenever data of a current environment are required, query corresponding sensor data at a central control unit of the vehicle and actively determine these data with respective sensors by using the central control unit.

In another possible embodiment of the method according to the invention, a polar grid may be selected as the curved coordinate system. In a polar grid, a radius and a run length are discretized, as long as a respective vehicle moves approximately on a circular path. For example, height values may be assigned to each grid cell of such a polar grid by transforming respective sensor data, thus creating an easily interpretable three-dimensional map of the current environment.

A current situation of a vehicle in the context of the presented invention relates to a vehicle dynamics, i.e. a longitudinal speed, a lateral acceleration, a steering angle and an actual vehicle environment, i.e. a road course, and/or a trajectory of other vehicles.

According to another possible embodiment of the method according to the invention, the curved coordinate system may be matched to a route to be traveled.

Since for automatic control of a particular vehicle generally only information about a route to be traveled is suitable, the curved coordinate system may be adapted, i.e. parameterized, especially by taking into consideration the route to be traveled, with suitably transformed sensor data entered in the curved coordinate system representing the respective route currently to be traveled, so that the vehicle can be automatically set to the respective route to be traveled.

The present invention is also directed to a control method for a vehicle wherein sensor data of a current environment of the vehicle determined with at least one sensor are transmitted to a central control unit encompassed by the vehicle, wherein the central control unit transforms the transmitted sensor data and then transmits the sensor data to curved coordinate system dynamically adapted to a current situation of the vehicle, and wherein the sensor data that were transmitted to the curved coordinate system and then transformed are used to control at least one component of the vehicle.

The control method according to the invention serves in particular to control a vehicle or components of a vehicle by carrying out the method according to the invention in the vehicle by using a central control unit.

According to one embodiment of the control method, a central control unit of a respective vehicle may transform data acquired from respective sensors of the vehicle and enter these data into the curved coordinate system and provide these managed sensor data to other components of the vehicle, such as an active suspension, a brake, an engine, a steering or a driver information system.

It is also conceivable that respective components of the vehicle have direct access to the central control unit and query sensor data stored in the central control unit, that were transformed and entered into the curved coordinate system, or let the central control unit determine these sensor data.

The respective components of the vehicle can adapt the situation of the vehicle, i.e. its driving dynamics, to the sensor data provided by the central control unit and transformed in the curved coordinate system and/or inform or warn a driver of conspicuous sensor data via, for example, a driver information system.

According to another possible embodiment of the control method according to the invention, sensor data that were already transmitted to the curved coordinate system may be transmitted to a respective control device of the at least one component of the vehicle and processed by the respective control device.

Respective components of the vehicle can be updated independently on the basis of centrally provided environment information through independent processing by a control unit of a particular component of the vehicle, thereby preventing potential collisions between queries from different control units of various components of the vehicle.

According to another possible embodiment of the method according to the invention, sensor data that were already acquired and transformed are taken into consideration in calculations for controlling respective components of the vehicle.

For aggregation and accumulation of environmental or environment and ambient features, sensor data that were already acquired by respective sensors may be cached and taken into consideration in the calculation of a respective current coordinate system, thereby generating a map of an environment traveled by a respective vehicle.

Potentially, for example statistical evaluations may be calculated based on the already acquired and transformed sensor data which can specify a security of the sensor data and which can be used to predict future events.

In a further possible embodiment of the method according to the invention, a rotational and/or translational movement of the vehicle in a defined time interval may be taken into consideration.

To account for the own movement of a respective vehicle in a respective transformation of sensor data into an actual coordinate system, prior knowledge may be transferred from a prior or obsolete coordinate system into an actual coordinate system, wherein the rotational and/or translational own movement of the respective vehicle in spatial dimensions, i.e. height, width and depth, is compensated by mathematical methods such as vector addition.

The present invention furthermore relates to a vehicle with at least one sensor for detecting a current environment of the vehicle and a central control unit, wherein the central control unit to be configured to transform sensor data detected by the at least one sensor and enter these data in a curved coordinate system, and wherein the central control unit is further configured to dynamically parameterize the curved coordinate system depending on a current situation of the vehicle.

In order to adapt or match a curved coordinate system to a current situation of a respective vehicle, i.e. to adapt for example a step width of the curved coordinate system to a speed of the vehicle, the central control unit of the vehicle may determine the current situation of the vehicle by way of sensors, such as an acceleration sensor and/or a speed sensor, and select the increment of the curved coordinate system so that a respective environment of the vehicle is represented in a space suitable for calculating driver assistance functions, wherein the space spans, for example, angle-radius coordinates.

The parametrization of the curved coordinate system may also be constantly updated, i.e. adjusted, during travel, so that the curved coordinate system also adapts to the changing environment and the changing situation of the vehicle.

When entering respective transformed sensor data into the curved coordinate system, an uncertainty factor, which would allow a driver assistance system to estimate a need for performing an optional control intervention based on probabilities, may be assigned to the sensor data.

The proposed vehicle is used in particular for carrying out the presented method.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
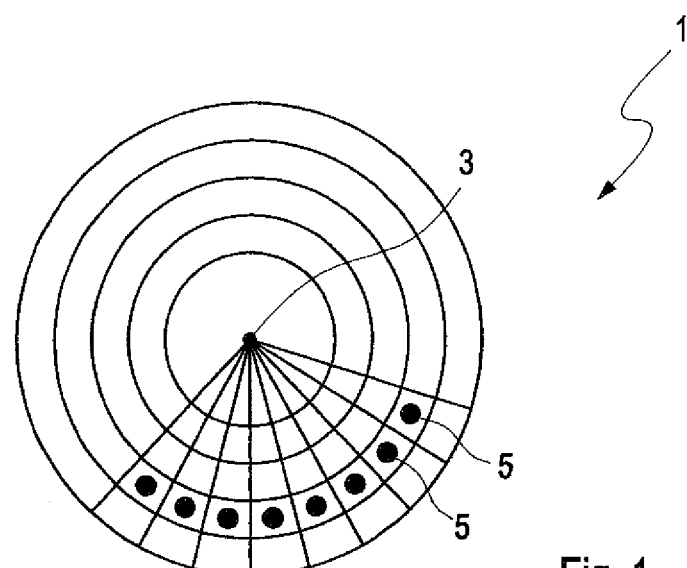
FIG. 1 shows a possible embodiment of the curved coordinate system according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a curved coordinate system in form of a polar coordinate system 1. The polar coordinate system 1 spans radial and angular coordinates, starting from a pole 3.

To enter sensor data of a sensor, for example a laser scanner of a vehicle, in the polar coordinate system 1, the sensor data which are usually provided by the sensor in Cartesian coordinates must first be transformed. This means that the Cartesian sensor data in radial and angular coordinates are converted into radial and angular coordinates, are optionally provided with an uncertainty factor and then entered into the polar coordinate system 1. Transformed sensor data 5 form corresponding sensor values, such as height or elevation values, at a discrete point in the space of the polar coordinate system 1. In other words, the polar coordinate system 1 describes respective characteristics of a current environment of the vehicle, for example by way of distance and angle information, and relevant sensor data are indicated within these properties. By choosing a curved coordinate system, curved features, such as a route, can be reproduced in the current environment directly, i.e. without additional transformations and corresponding calculations.

When driving the vehicle, the polar coordinate system 1 can be re-parameterized by compensating the own movement depending on, for example, a vehicle speed, thereby changing a step width of the radial coordinates and selecting, for example, a larger step size at a higher speed. A large area of a current environment of the vehicle can be displayed by selecting a large increment of the radial coordinates, so that the polar coordinate system 1 is able to represent the current environment of the vehicle even for large traveled distances. For example, an active suspension can be adjusted to future height differences of a road to be traveled by using sensor data 5 matching the current environment in the polar coordinate system 1, thus enabling automatic compensation of bumps on the road.

Figure 2:
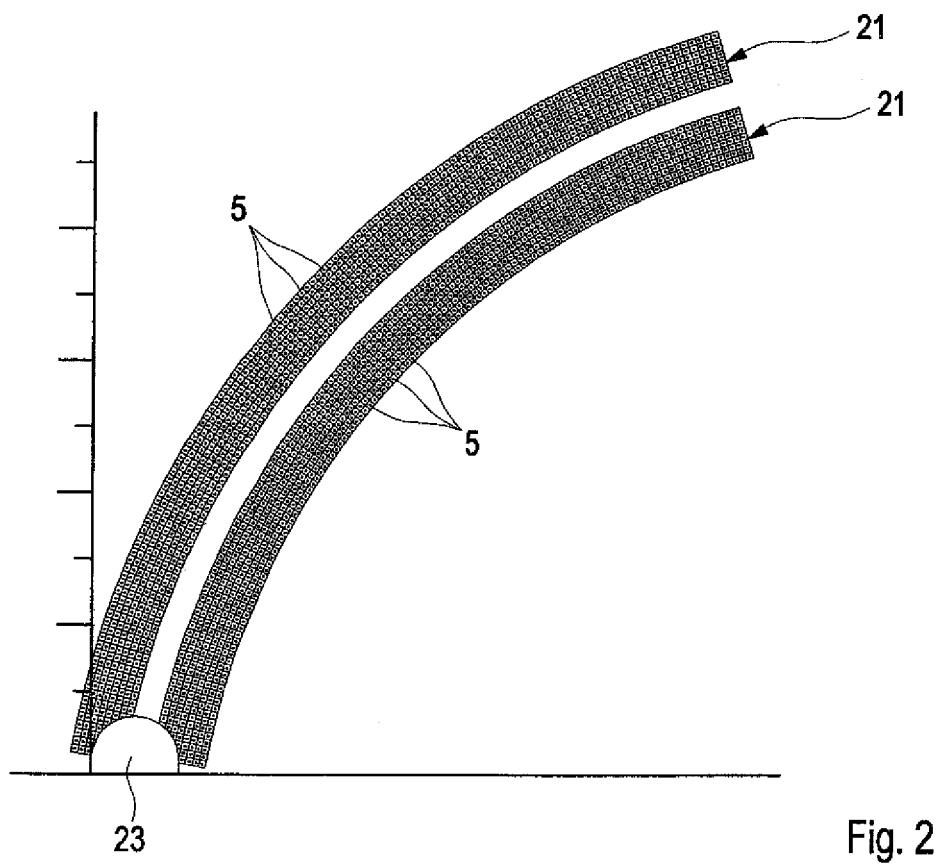
FIG. 2 shows another possible embodiment of the curved coordinate system according to the present invention.

FIG. 2 shows a further possibility of a changing parameterization of a coordinate system 21. The coordinate system 21 curves depending on a setting of wheels of a front axle of a vehicle 23. In the case shown in FIG. 2, a separate coordinate system 21 is assigned to each front wheel of the vehicle 23, in which respective sensor data 5 are entered. This means that sensor data 5 entered in the coordinate system 21 are displaced together with the coordinate system 21 when the coordinate system 21 changes in dependence of a change of a respective wheel position of the front wheels of the vehicle 23 so that the sensor data 5 always represent an identical location in the environment of the vehicle. The sensor data 5 thus remain fixed in the coordinate system 21 even when a lane of the vehicle 23 changes and do not change their position. Instead, the coordinate system 21 optionally changes, if the coordinate system 21 is no longer suitable to represent the current environment or the lane of the vehicle 23.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A method for processing sensor information in a vehicle, comprising:
    transforming sensor data acquired with at least one sensor of the vehicle from a current environment of the vehicle into a separate curved coordinate system assigned to each front wheel of the vehicle, said curved coordinate system including a polar grid being curved according to a route that wheels of the vehicle are traveling, wherein the polar grid contains information about the current environment and an uncertainty factor of the transformed sensor data,
    continuously updating the sensor data while the vehicle is moving,
    dynamically adapting the curved coordinate system to a current situation of the vehicle, and
    processing the transformed sensor data and modifying an active suspension system of the vehicle by using the processed sensor data matching the current environment in the polar coordinate system for future height differences of a road to be traveled, thereby enabling an automatic compensation of bumps on the road.

2. The method of claim 1, further comprising adapting at least one component of at least one automatic vehicle control system of the vehicle to the current environment of the vehicle depending on current data entered in the curved coordinate system.

3. The method of claim 1, wherein the current situation of the vehicle includes at least one of a vehicle dynamics and the current environment of the vehicle.

4. The method of claim 1, wherein the current environment includes trajectories of the vehicle in the current environment.

5. The method of claim 1, wherein the curved coordinate system is matched to a route to be traveled.

6. A method for controlling a vehicle, comprising:
    transmitting sensor data of a current environment of the vehicle acquired by at least one sensor of the vehicle to a central control unit of the vehicle, transforming with the central control unit the transmitted sensor data into a separate curved coordinate system assigned to each front wheel of the vehicle that is dynamically adapted to a current situation of the vehicle, said curved coordinate system including a polar grid being curved according to a route that wheels of the vehicle are traveling, wherein the polar grid contains information about the current environment and an uncertainty factor of the transformed sensor data, controlling at least one component of the vehicle with the sensor data that were transformed into the curved coordinate system, and processing the transformed sensor data and modifying an active suspension system of the vehicle by using the processed sensor data matching the current environment in the polar coordinate system for future height differences of a road to be traveled, thereby enabling an automatic compensation of bumps on the road.

7. The method of claim 6, wherein the at least one component of the vehicle comprises a component selected from an active suspension, brakes, an engine, a steering system and a driver information system.

8. The method of claim 6, further comprising:
processing the transmitted and transformed sensor data in the central control unit, and
transmitting the processed sensor data to the at least one component of the vehicle.

9. The method of claim 6, further comprising:
transmitting the transmitted and transformed sensor data to at least one control device of the at least one component of the vehicle, and
processing the transmitted and transformed sensor data with the respective control device.

10. The method of claim 6, further comprising taking into account the already acquired and transformed sensor data in calculations for controlling respective components of the vehicle.

11. The method according to claim 1, wherein the current situation of the vehicle comprises at least one of a rotational and translational movement of the vehicle in a defined time interval.

12. The method according to claim 6, wherein the current situation of the vehicle comprises at least one of a rotational and translational movement of the vehicle in a defined time interval.

13. A vehicle comprising:
at least one sensor for detecting a current environment of the vehicle, and
a central control unit configured to transform sensor data acquired by the at least one sensor into a separate curved coordinate system assigned to each front wheel of the vehicle, said curved coordinate system including a polar grid being curved according to a route that wheels of the vehicle are traveling,
wherein the polar grid contains information about the current environment and an uncertainty factor of the transformed sensor data, and to dynamically parameterize the curved coordinate system depending on a current situation of the vehicle, and
wherein the transformed sensor data is processed and an active suspension system of the vehicle is modified by using the processed sensor data matching the current environment in the polar grid describing future height differences of a road to be traveled, thereby enabling an automatic compensation of bumps on the road.

* * * * *